Figure 1:
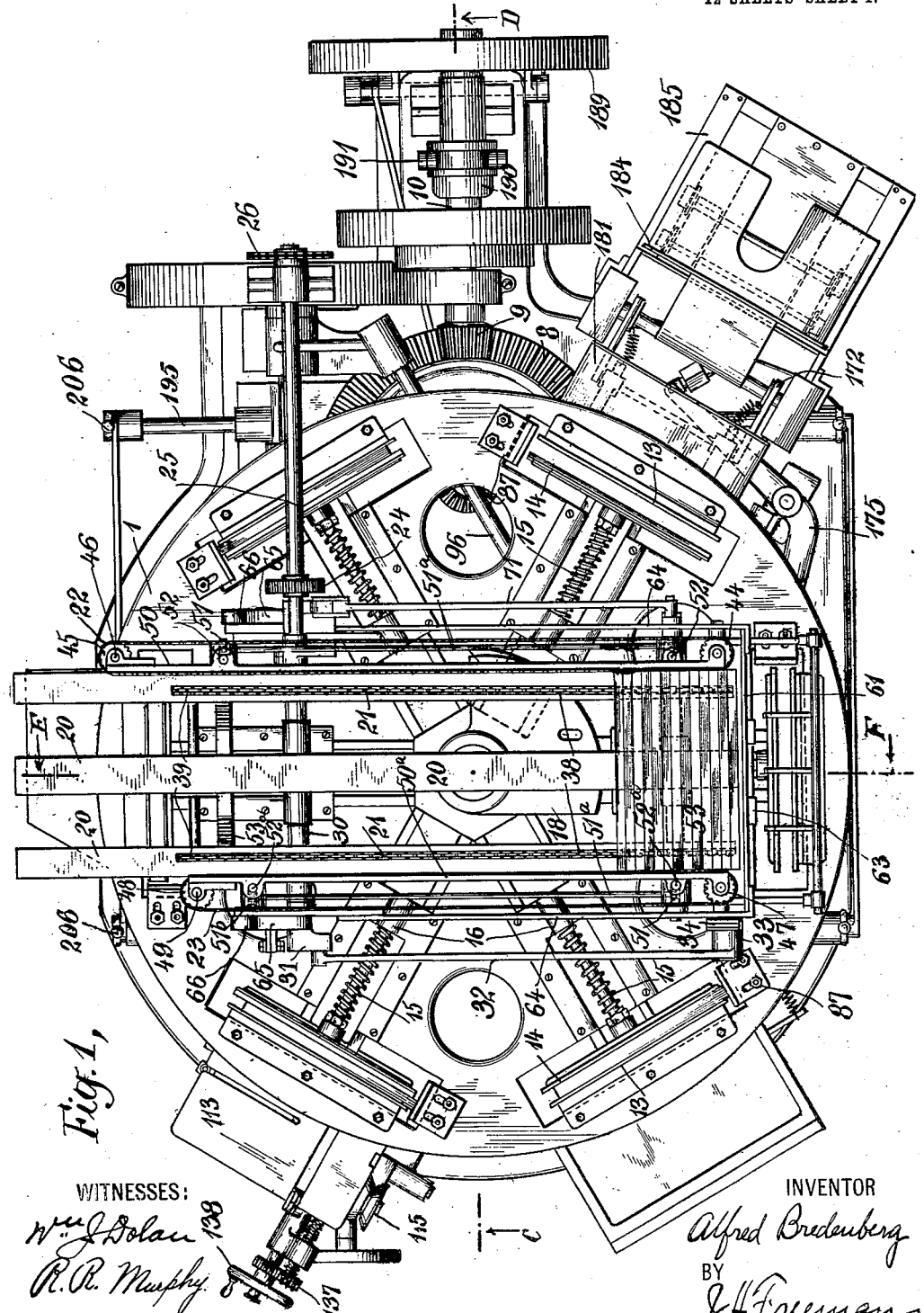

A. BREDENBERG.
PAMPHLET COVERER.
APPLICATION FILED JAN. 12, 1910.

1,085,888.

Patented Feb. 3, 1914.
12 SHEETS—SHEET 1.

WITNESSES:

INVENTOR
Alfred Bredenberg
BY
ATTORNEY

A. BREDENBERG.
PAMPHLET COVERER.
APPLICATION FILED JAN. 12, 1910.

1,085,888.

Patented Feb. 3, 1914.
12 SHEETS—SHEET 2.

WITNESSES:
Wm. J. Dolan
R. R. Murphy

INVENTOR
Alfred Bredenberg
BY J. H. Freeman
ATTORNEY

A. BREDENBERG.
PAMPHLET COVERER.
APPLICATION FILED JAN. 12, 1910.

1,085,888.

Patented Feb. 3, 1914.
12 SHEETS—SHEET 3.

WITNESSES:
INVENTOR
Alfred Bredenberg
BY
ATTORNEY

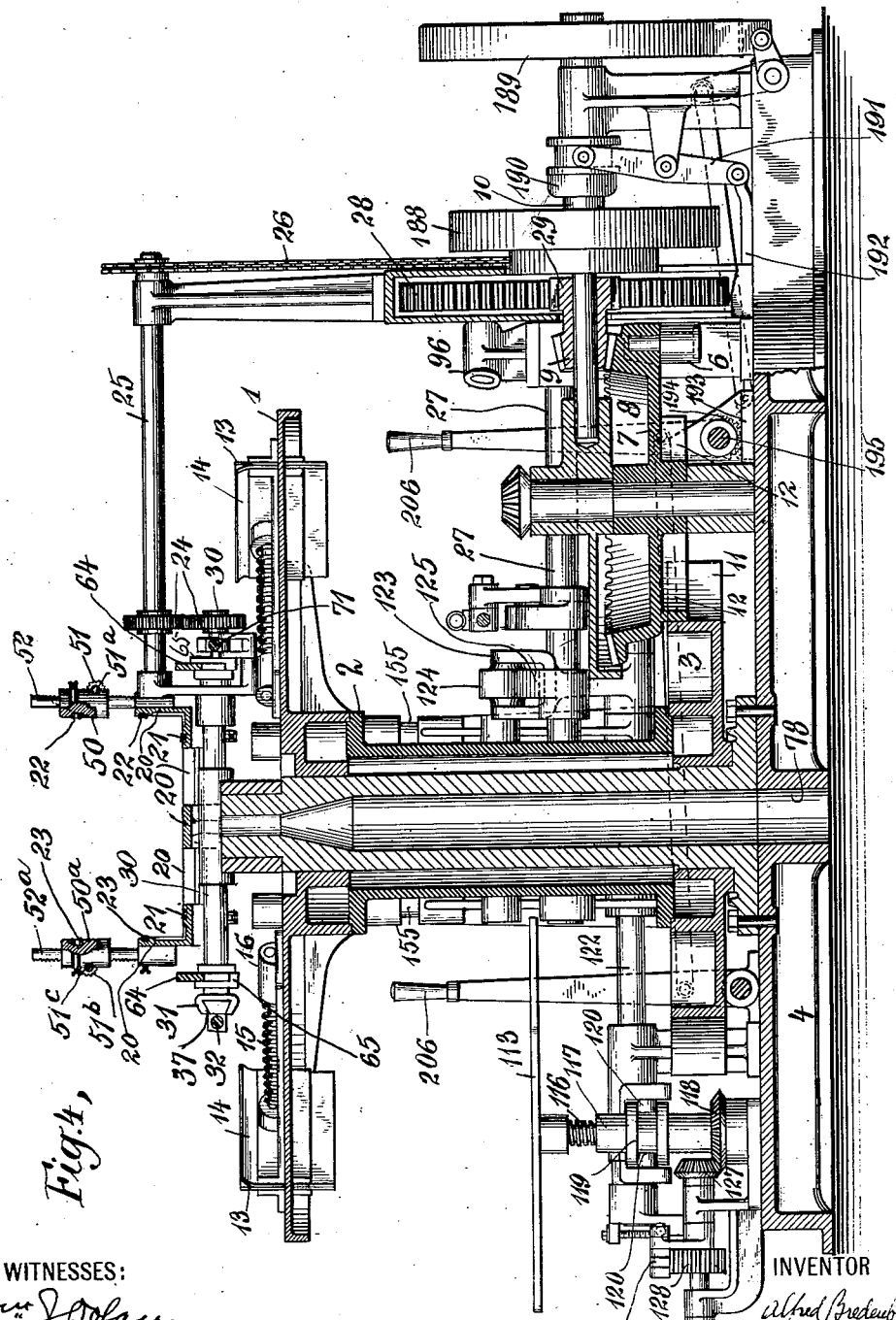

A. BREDENBERG.
PAMPHLET COVERER.
APPLICATION FILED JAN. 12, 1910.
1,085,888.
Patented Feb. 3, 1914.
12 SHEETS—SHEET 5.
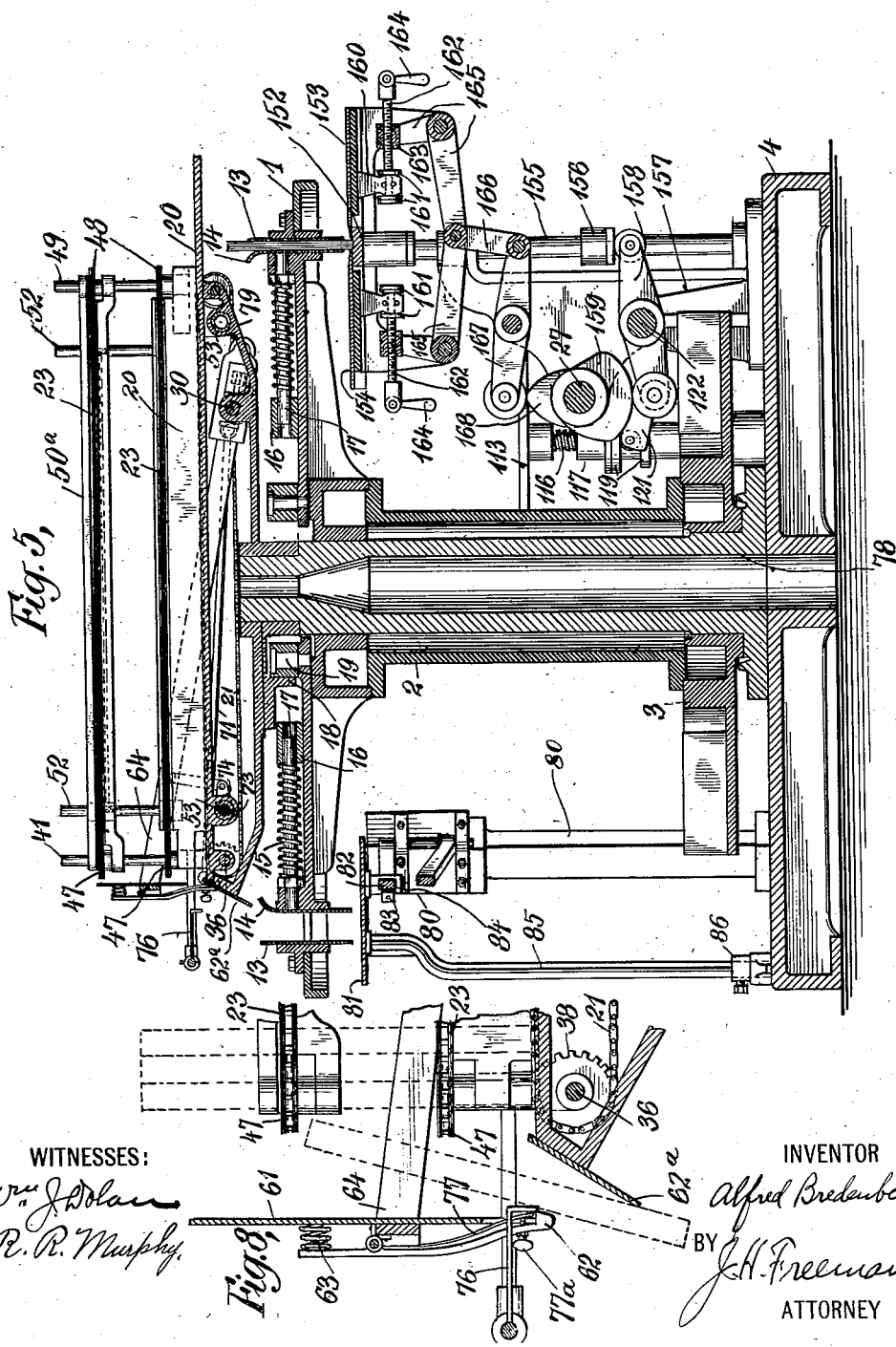

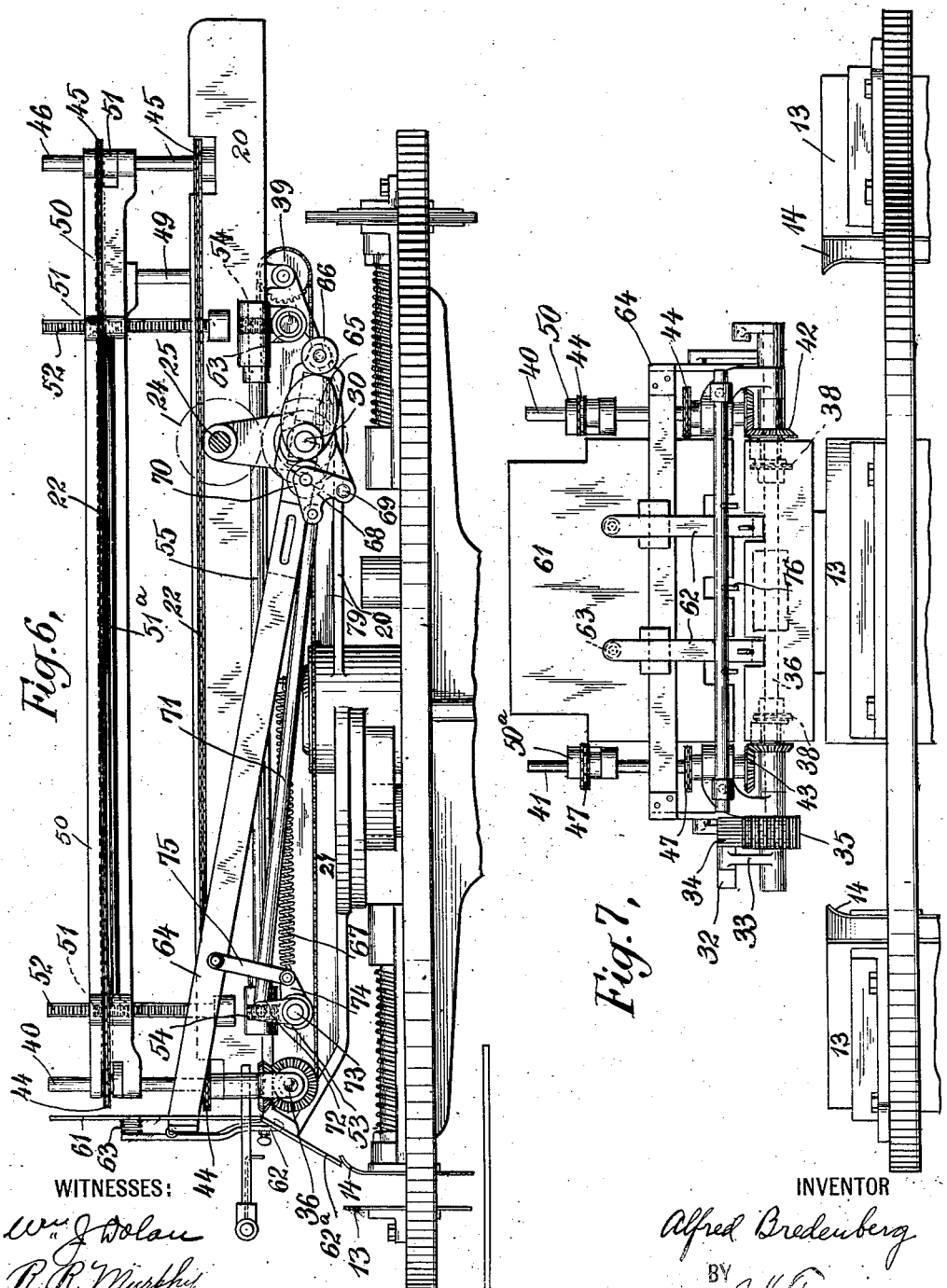

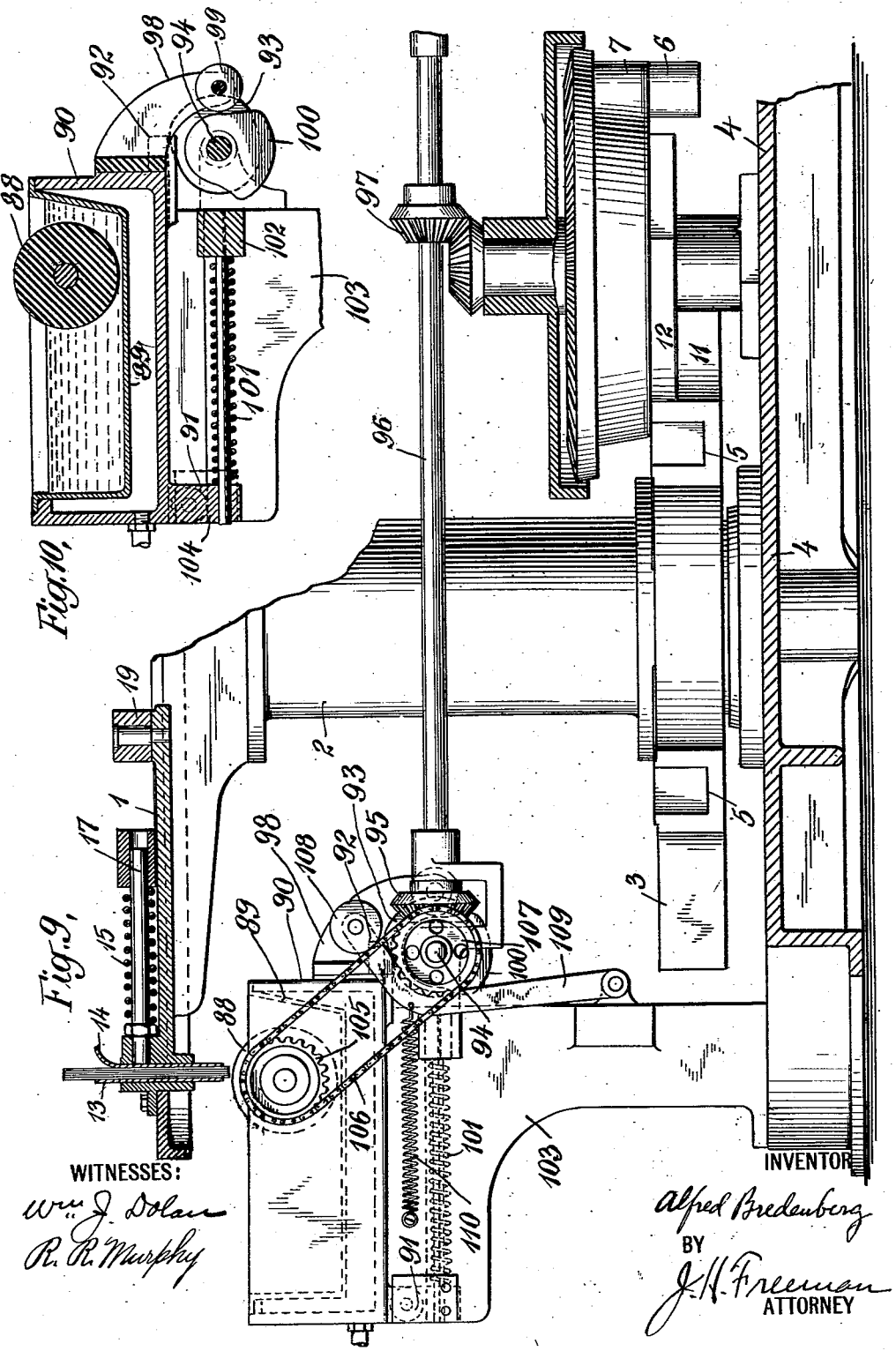

A. BREDENBERG.
PAMPHLET COVERER.
APPLICATION FILED JAN. 12, 1910.

1,085,888.

Patented Feb. 3, 1914.
12 SHEETS—SHEET 8.

WITNESSES:

INVENTOR
Alfred Bredenberg
BY
ATTORNEY

A. BREDENBERG.
PAMPHLET COVERER.
APPLICATION FILED JAN. 12, 1910.
1,085,888.
Patented Feb. 3, 1914.
12 SHEETS—SHEET 9.
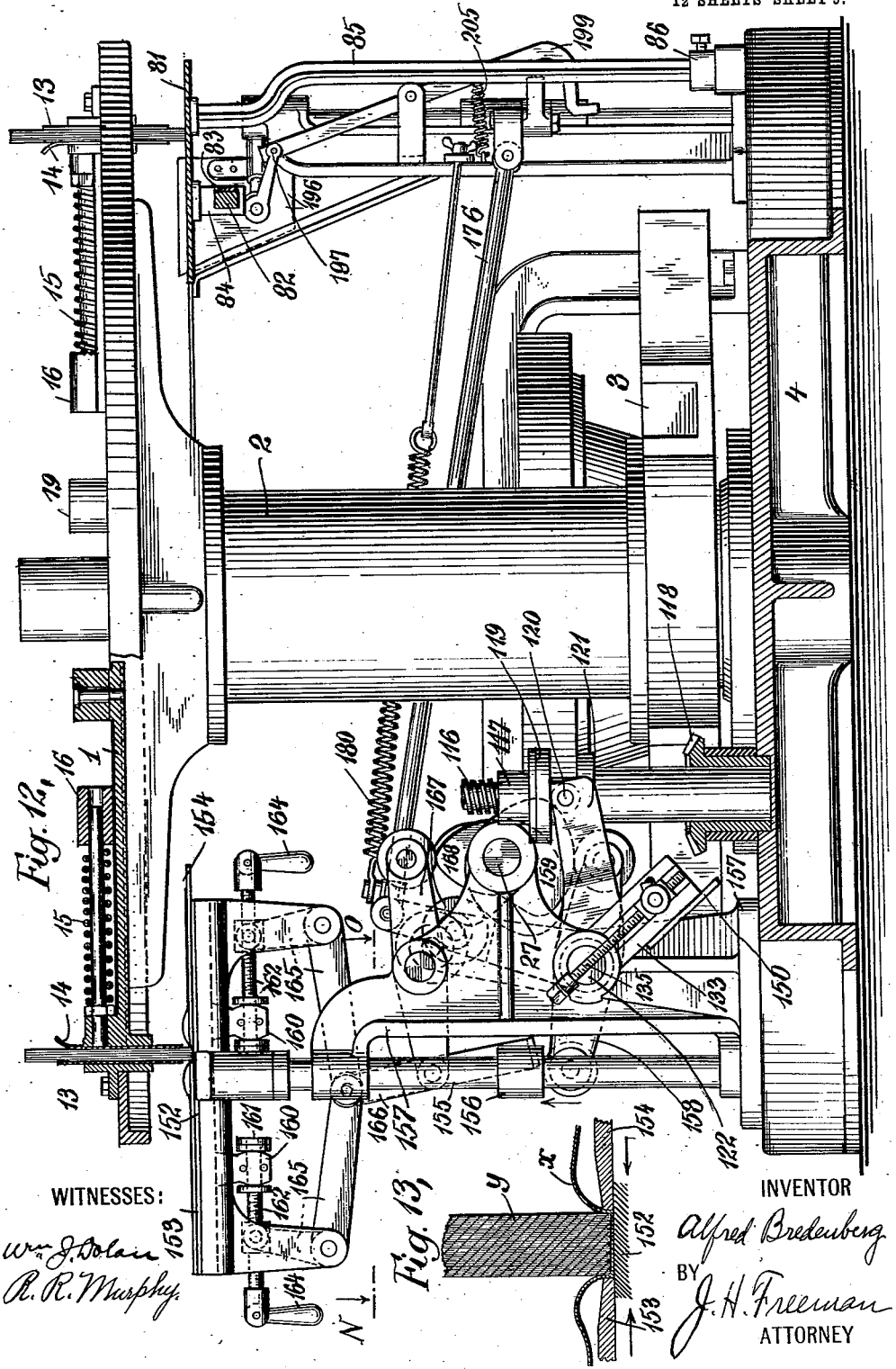
WITNESSES:
Wm. J. Dolan
R. R. Murphy
INVENTOR
Alfred Bredenberg
BY
J. H. Freeman
ATTORNEY

A. BREDENBERG.
PAMPHLET COVERER.
APPLICATION FILED JAN. 12, 1910.

1,085,888.

Patented Feb. 3, 1914.
12 SHEETS—SHEET 10.

WITNESSES:

INVENTOR
Alfred Bredenberg
BY
ATTORNEY

A. BREDENBERG.
PAMPHLET-COVERER.
APPLICATION FILED JAN. 12, 1910.
1,085,888.
Patented Feb. 3, 1914.
12 SHEETS—SHEET 11.
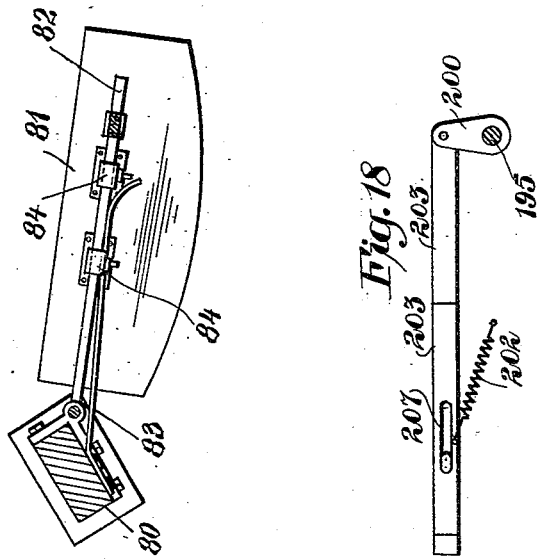
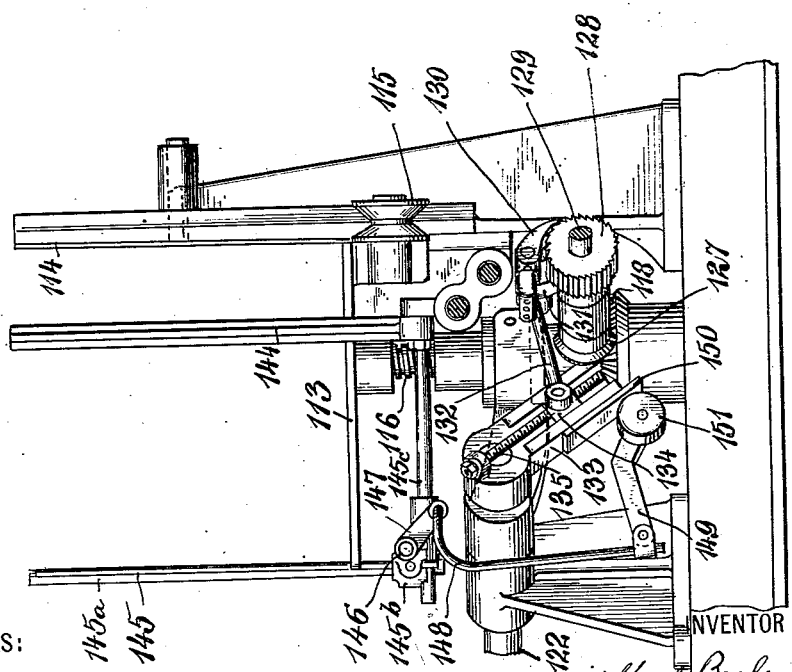

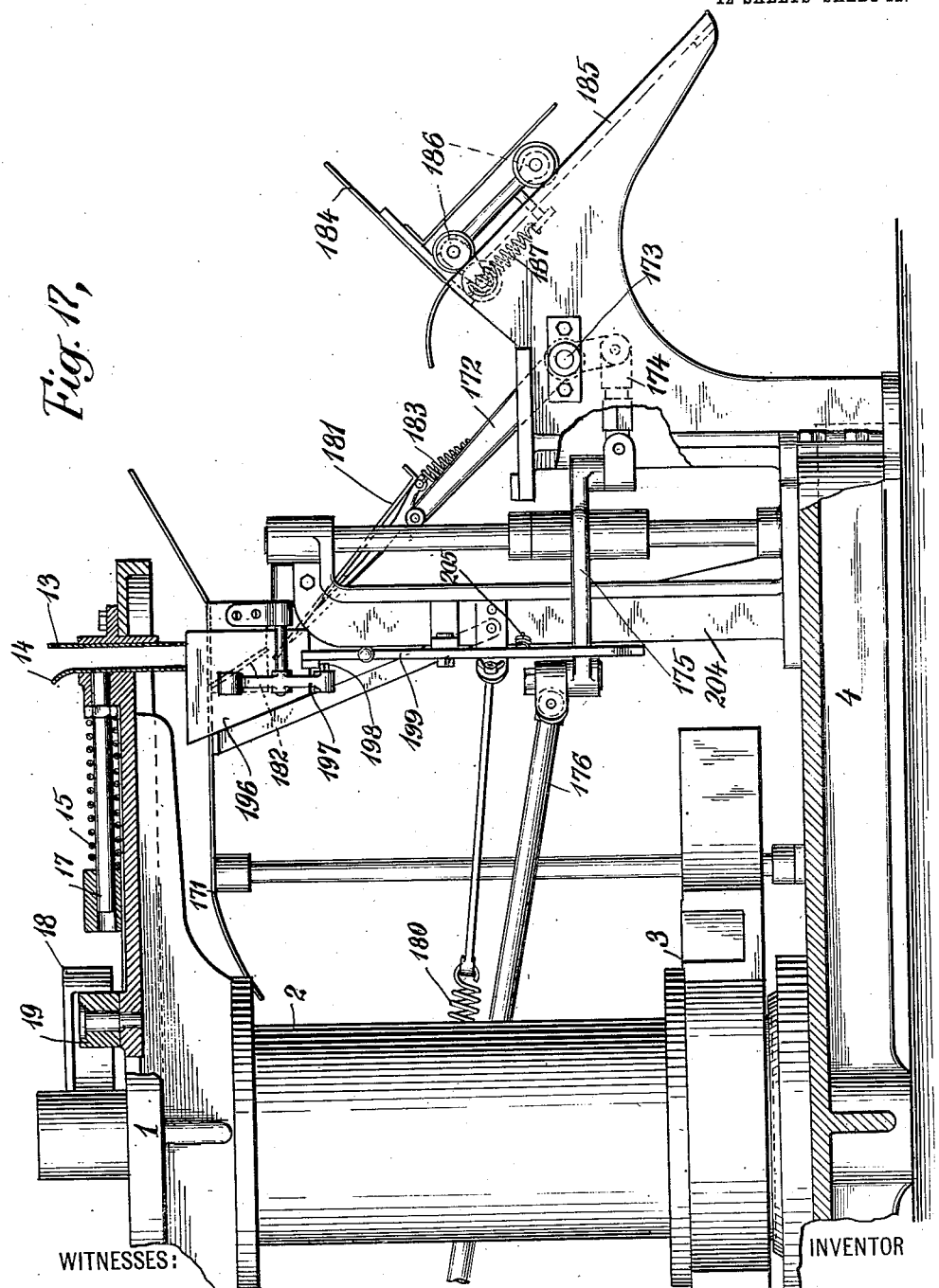

UNITED STATES PATENT OFFICE.

ALFRED BREDENBERG, OF CHAMPLAIN, NEW YORK, ASSIGNOR OF ONE-HALF TO THE SHERIDAN IRON WORKS, A CORPORATION OF NEW YORK, AND ONE-HALF TO T. W. & C. B. SHERIDAN COMPANY, A CORPORATION OF NEW YORK.

PAMPHLET-COVERER.

1,085,888. Specification of Letters Patent. Patented Feb. 3, 1914.

Application filed January 12, 1910. Serial No. 537,694.

*To all whom it may concern:*

Be it known that I, ALFRED BREDENBERG, a citizen of the United States, and a resident of Champlain, Clinton county, New York, have invented certain new and useful Improvements in Pamphlet - Coverers, of which the following is a specification.

My invention relates to book covering machines; and, while more particularly directed in certain of its features to machines for attaching flexible covers of paper or similar material to books, pamphlets and the like, various features of the invention may be employed in other relations.

Objects of the invention are to provide a machine which is of relatively simple and compact construction; which shall require relatively little supervision by attendants; which shall perform a large number of sequential steps automatically and efficiently; and which is capable of operating upon books varying greatly in dimensions.

Further objects of the invention are to provide means for supplying the uncovered books to the machine, which has a relatively large storage capacity and which positively controls the books stored therein and separates the books and delivers them one at a time to the cover applying devices with great precision; also to provide improved parts or groups of mechanisms within the machine for the purpose of performing the various operations involved in covering; to provide for the extensive automatic control of the machine by the material being operated upon; and to provide a mechanism which receives the books from the cover-applying devices, stores them and permits their removal without liability of displacing the freshly applied covers.

These and other objects of the invention will in part be obvious and in part more fully appear herein.

The invention consists in the novel parts, mechanisms, combinations, arrangements, and improvements herein shown and described.

The accompanying drawings, referred to herein and forming a part hereof, illustrate one embodiment of the invention, the same serving in connection with the description herein to explain the principles of the invention.

Figure 2:
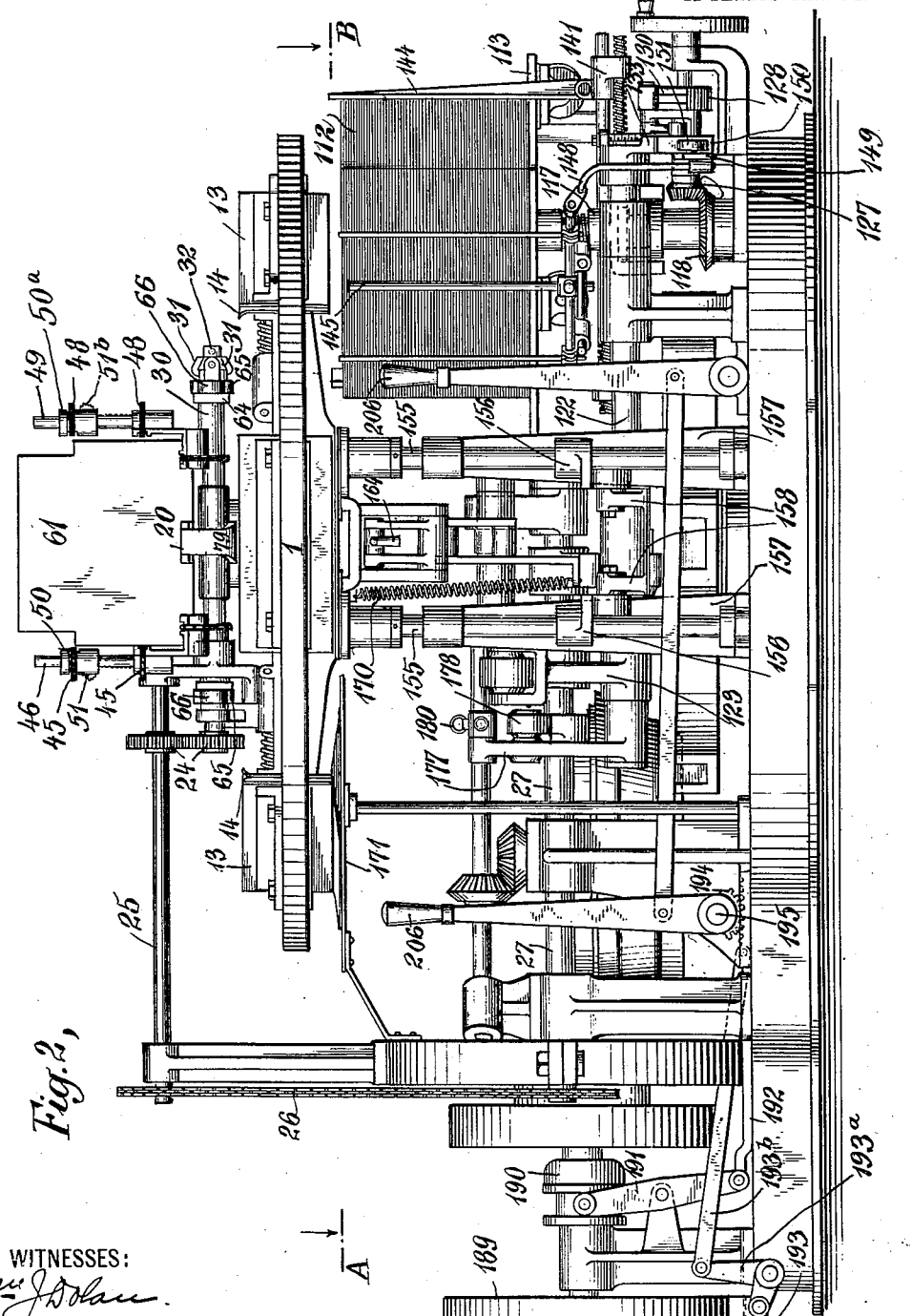
Figure 3:
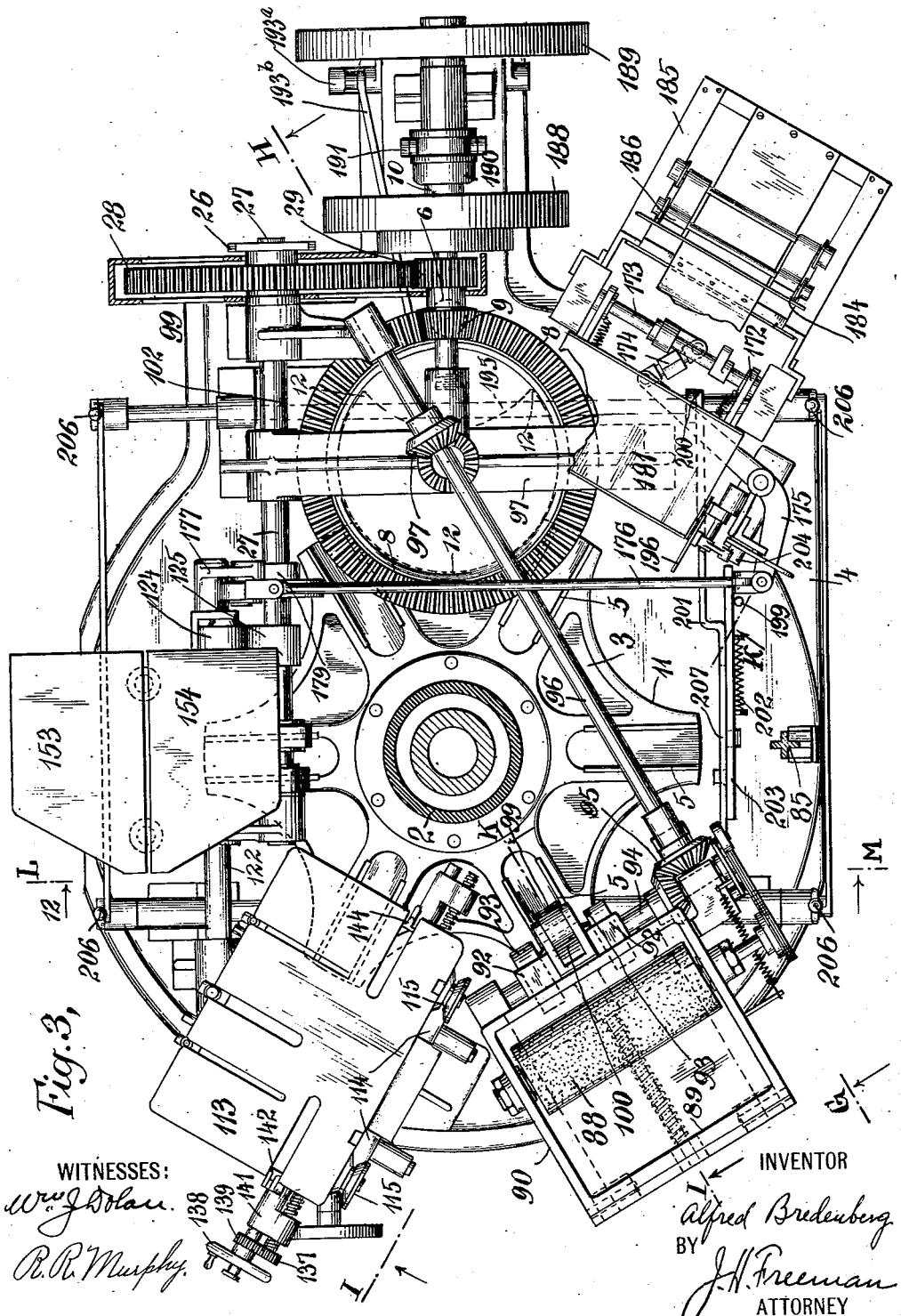
Figure 11:
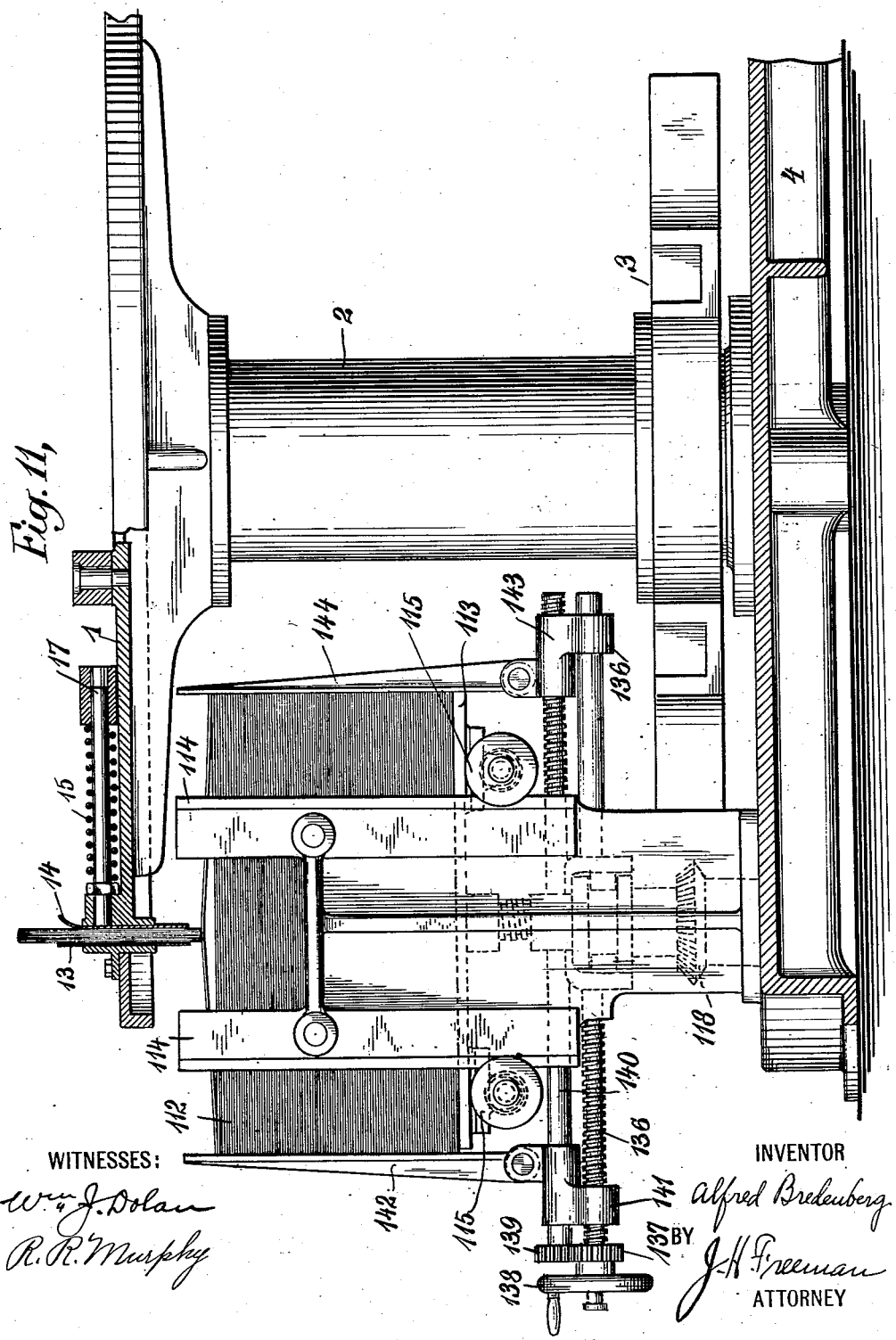
Figure 14:
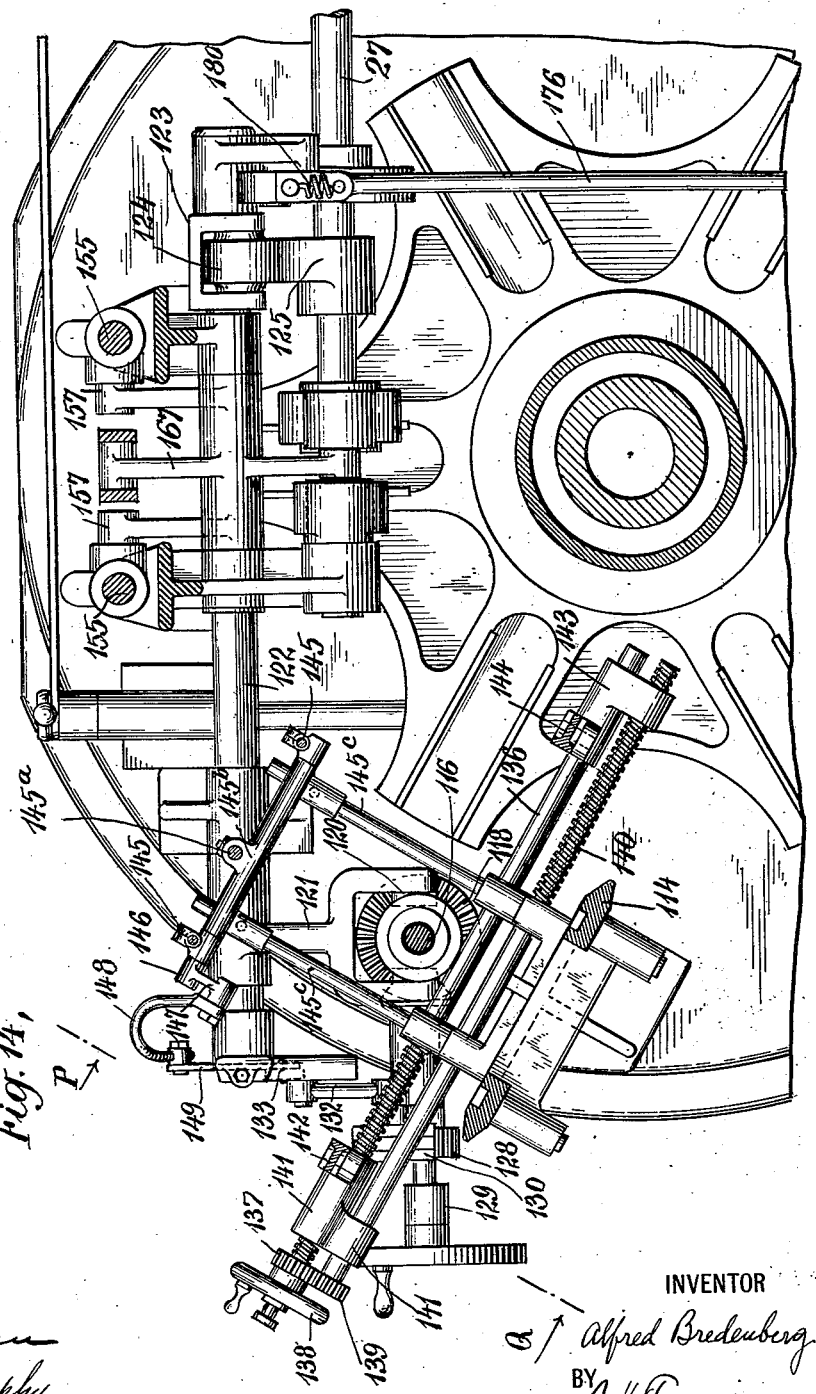

Of the drawings: Figure 1 is a plan of a machine embodying the invention; Fig. 2 is an elevation looking from the top of Fig. 1; Fig. 3 is a sectional plan on the line A—B of Fig. 2; Fig. 4 is a transverse vertical section on the line C—D of Fig. 1; Fig. 5 is a transverse vertical section on the line E—F of Fig. 1; Fig. 6 is a detail side elevation, showing on an enlarged scale the holding and conveying means for the series of books to be covered; Fig. 7 is an end elevation corresponding to Fig. 6 looking to the right; Fig. 8 is a fragmentary detail, showing the book-separating mechanism on a still larger scale; Fig. 9 is a fragmentary vertical section substantially on the line G—H of Fig. 3; Fig. 10 is a detail view of the adhesive applying mechanism; Fig. 11 is a fragmentary vertical section substantially on the line I—K of Fig. 3; Fig. 12 is an elevation, with parts in section substantially on the line L—M of Fig. 3; Fig. 13 is a detail of the cover-breaking device; Fig. 14 is a sectional plan substantially on the line N—O of Fig. 12; Fig. 15 is a detail elevation, with parts in section, on the line P—Q, looking in the direction of the arrows of Fig. 16; Fig. 16 is an inverted plan of parts of the book-feeding mechanism; and Fig. 17 is an elevation, partly in section, showing the delivering mechanism. Fig. 18 is a similar view illustrating a detail.

In the illustrated embodiment of the invention a series of book-conveying devices are provided traveling in a circular path in a substantially horizontal plane. The various groups of mechanisms are arranged along said path so that each conveying means will present the book held by it sequentially to each mechanism for the performance of the successive steps in covering. In the present embodiment a holder for a series of uncovered books is provided. It is arranged above the space inclosed by the circular path in which the book - conveying means travel. This arrangement conduces to convenience in the loading in of the uncovered books and in their delivery to the book-conveying means, and also conduces to the compactness of design desired.

The book-conveying means are carried by suitable supporting means, such as the plate 1. In this embodiment the plate 1 is made rotatable for the purpose of moving the book-conveying means in a circular path, and said plate is shown mounted upon a column 2 fixed to a base 3, the whole being rotatable upon the frame 4 of the machine.

Means are provided for progressing the book-conveying means and for stopping them at the stations or locations of the mechanisms for operating upon the books. Said means positively progress the book-conveying means and also hold the same stationary when not being progressed; that is, when in operative relation with the mechanisms for performing the steps in the covering of the book. The particular form of such means illustrated (see especially Figs. 3, 4, and 9) comprises grooves 5 in the base 3, which are arranged radially with reference to the rotation of the base and the parts supported thereby, and a roller 6 carried by the web 7 of gear wheel 8 which is driven by the pinion 9 on the shaft 10. When the roller 6 enters one of the grooves 5, the base 3 and the parts connected thereto are advanced through one step.

The form of means shown herein for holding the book-conveying means stationary between successive progressions comprises circular recesses 11 in the base 3 and a circular part 12 on the wheel, so shaped and located with respect to the roller 6 as to successively engage the recesses 11 and hold the base 3 stationary while the roller 6 is passing from one groove 5 to the next.

In the embodiment of the invention illustrated herewith the particular form of book-conveying means shown (see Figs. 1, 5, 9, 12, and 17) comprises a series of holding or clamping devices, each having opposed plates or jaws relatively movable to approach and to recede from each other. The jaw 13, as illustrated, is fixed to the table 1, the jaw 14 being movable to and from the jaw 13 to engage and to release the book and also to accommodate books of different thicknesses. The movable plate or jaw 14 is shown slidably mounted on the table 1 and also as being spring-pressed toward its companion jaw or plate 13. The particular form of said spring-pressed means comprises a spring 15 conveniently coiled about a stem 17 fixed to the jaw 14 and slidably mounted in an apertured lug 16 carried on the table 1. Suitable means for automatically opening the book-clamping devices to deliver and receive the books are provided, and the form thereof illustrated comprises a suitable cam 18 engaging parts connected to the movable jaws 14, such as the rollers 19. The cam 18 acting on the rollers 19 serves to open the jaws 14 against the action of the springs 15, the springs acting to again press the jaws 14 toward their companion jaws 13 when the roller passes out of engagement with the cam.

One feature of the invention provides for a holder for a series of the uncovered books arranged above the space inclosed by the circular path of the series of book-conveying means. The form of holder shown (see especially Figs. 1 and 5 to 8) comprises horizontally arranged supports 20. Advancing means acting on the books in the holder to advance them therein as they are fed away one by one to the book-conveying means are provided, said means acting directly upon each book in the series, thereby giving certain and reliable advancing movement to the series. Said advancing means, as shown, act upon the edges of the books in the holder. Means are also provided for varying the position of the advancing means to feed books of different page size. The illustrated form of the advancing means comprises endless chains or bands 21 arranged along the bottom of the holder, and other chains or bands 22 and 23 arranged at each side thereof, all moving in the direction of the delivery end of the holder. Suitable driving means are provided, the form thereof shown (see Figs. 1, 2, and 4) comprising gears 24 driven from a shaft 25 connecting by a sprocket chain 26 to a shaft 27 driven by a gear 28 from a pinion 29 on the drive shaft 10. One of the gears 24 is fixed on a shaft 30. Connected to the shaft 30 is a crank 31 connecting by the link 32 to the arm 33 carrying a gang of pawls 34 in operative relation with a ratchet 35 fixed to a shaft 36. Between the crank 31 and link 32 is a sliding block connection, as shown at 37 in Fig. 4 of the drawings, to vary the throw of the arm 33 for each rotation of the crank 31. This gives an exceedingly fine and nice adjustment of the advancing means, as well as a substantial construction, enabling the machine to feed automatically books of all thicknesses within the practical limits of such a machine. The shaft 36 is provided with sprockets 38 which mesh with the chains 21, said chains passing also over suitable wheels 39 at the opposite end of the holder.

The chains 22 and 23, acting upon the vertical edges of the books are driven from the shaft 36 and for this purpose vertical shafts 40 and 41 are connected respectively by miter gears 42 and 43 with the shaft 36. The shaft 40 is provided with sprockets 44 which mesh with the chains 22 which are supported at or near the opposite end of the book holder by wheels 45 carried upon a vertical shaft 46. A similar arrangement is shown upon the opposite side of the holder, sprockets 47 upon the shaft 41 engaging with the chains 23 which are likewise arranged along the conveyer and supported upon sprockets 48 carried by a vertical shaft 49. It will be understood that as the books rest upon their edges in the holder 1, the advancing means will act upon the edges of each book and advance the entire series forward at a speed which may be regulated, through the nice adjustment provided, to correspond with the thickness of the books and with the speed at which the books are transferred to the book-conveying means. It will be seen also that the duty placed upon the advancing means is substantially uniform despite variations in the number or weight of books which may be in the holder, as the advancing means act upon each book, whether they be many or few.

Means for varying the position of the advancing means for operating upon books of different page size are provided, as previously indicated, and the form of such means herein shown comprises devices for moving the driving means for the chains or bands 21, 22, and 23, or certain of them, on their shafts, while maintaining rotative connection therewith. The upper set of sprockets 44 and 45 are carried in a guide piece 50 slidable on the shafts 40 and 46, the sprockets being splined to their respective shafts. Means for moving the guide 50 are provided, comprising pinions 51 engaging respectively with racks 52, said pinions being fixed on a shaft $51^a$, whereby the opposite ends of the guide will be raised and lowered uniformly. Means of any suitable form for actuating the pinion shaft may be utilized. Similar means for adjusting the sprockets 47 and 48, carrying the upper chain 23 on the opposite side of the holder, are provided, the same including a guide $50^a$, pinions $51^b$, pinion shaft $51^c$, and racks $52^a$, all substantially the same as the corresponding parts above described. On one side the shaft 46 is located farther to the rear than the shaft 49, the chains 22 and the guide 50 being longer than the chains 23 and the guide $50^a$ on the other side to facilitate the placing of the books in the holder.

The supports for the chains or bands 21 have pinions 54 engaging the rack bars 53, (see Fig. 6) one of which is fixed in the rearwardly extending portion of the frame 79 (see Fig. 5) and the other of which is fixed in the central support 20 rigidly connected to the said frame. The pinions are fast on a shaft 55, and by turning this shaft in any suitable way which will be obvious to any mechanic skilled in the art the side members 20 of the holding means together with the chains 21 may be moved to and fro to make the holder fit the books to be covered. Only one shaft 55 with its pinions 54 is shown (see Fig. 6) but it is to be understood that these parts are duplicated at the opposite side of the holder.

Means for transferring the books successively to the book conveyers to be carried to the various covering mechanisms are provided. The illustrated form of such means (see Figs. 6 and 8) comprises devices for lifting or sliding the end book of the series upwardly for a short distance, then moving it outwardly and then by a guide or deflector causing it to drop into the book-conveying means which is then positioned beneath and in operative relation with the transferring means. The illustrated form of said means comprises a plate 61 carrying fingers 62 pivotally connected thereto and being acted on by the spring 63. The devices just described are given a four-way motion. For this purpose the plate 61 is connected to arms 64, the other end of each of the arms 64 being yoked about the shaft 30. Cams 65 upon the shaft act on rollers 66 carried by the arms 64, the cams and rollers being held in operative relation by suitable means, such as a spring 67. An arm 68 is shown pivoted at 69 having a roller 70 which bears on the cam 65. Pivoted to the arm 68 is a link 71 connected to an arm 72 fixed to a shaft 73 which extends across the holder through the forward rack member 53, which is made hollow for this purpose. Fixed to each end of said shaft is an arm 74 connected by the pivoted link 75 to the corresponding arm 64. These connections act to bring the lifting finger 62 beneath the lower edge of the last book in the series, then to lift or slide it upwardly to free it from a projection formed by the upper edge of a deflector plate $62^a$, and then to carry it outwardly. Located adjacent to the said parts are stop fingers 76 suitably supported from the holder or other part of the machine. As the book is carried backwardly, it is engaged by these stops 76, and is pushed off the fingers 62, being guided by the deflector plate $62^a$ between the jaws 13 and 14 of the conveyer. To vary the extent that the fingers 62 project to accommodate them to books of different thicknesses springs 77 are provided which are adjusted with relation to the fingers by set screws $77^a$. The holder for the series of books is supported upon a central column 78 upon which the rotatable column 2 is journaled.

A suitable device is provided for receiving the book and positioning it in proper relation to the jaws 13 and 14 before it is clamped thereby. Said means, as shown herein (see especially Figs. 5, 12, and 16) comprises a table 81 upon which the book rests when deposited between the jaws 13 and 14 of the book-conveying means. The table is movable away from beneath the clamp so that a book may be readily removed therefrom, if desired. For this purpose the table is supported upon a swinging bracket 82, which is acted upon by a spring 83 to hold the table beneath the clamp. The bracket is pivoted to a suitable support 80 which also carries a spring 83. The table 81, as shown, is further adjustably carried upon the bracket 82 by means of lugs 84, having a screw and slot connection with the bracket 82. A supporting rod 85 just beneath but separated from the table 81 is shown, the said rod being carried by the frame 4 and being adjustable by means of a set screw 86. Means are also provided for regulating the position of the book lengthwise of the clamp, and the particular form thereof shown comprises gages 87 on the table 1, adjustable to and from the jaws 13 and 14. The parts are so timed that the book will be engaged by the gage 87 just prior to the clamping of the jaw 14, thus bringing each accurately and uniformly to position.

In accordance with one feature of the invention means are provided for applying the adhesive to the back of the book while the book is stationarily held by the clamp. In the embodiment illustrated, this means comprises a roller 88 suitably journaled in a receptacle 89 for the adhesive, the receptacle shown being provided with a steam jacket 90 to adapt it for maintaining glue in a liquid state. In order that this roller may apply a plentiful supply of adhesive to the back of the book, and particularly to the lateral edges thereof without the liability of applying any adhesive to the ends of the book, a roller is caused to move up so that its upper edge is in plane of the back of the book, then transversely of the book, then down out of contact with the book and back to its original position, the roller being rotative positively so that its surface will have rolling contact with the book back. In the embodiment shown, the movements described are imparted to the roller by the following mechanism. Casing 90 forming the steam jacket and carrying the receptacle 89 is slidably mounted on its outer end on rollers 91. At its inner end the casing is provided with shoes 92 which rest upon a pair of cams 93 fixed on the shaft 94. This shaft is connected by means of miter-gears 95, shaft 96 and miter gears 97 with the axis of the gear 8. The cams 93 are given such form, as shown in Fig. 10, as will adapt them to raise the lower and inner end of the casing 90 at the proper times during each cycle of operation. To give the roller 88 its inward and outward movement the inner end of the casing 90 is provided with a bracket 98 having a roller 99 arranged to engage the cam 100 fixed on the shaft 94 between the cams 93 as is clearly shown in Figs. 3 and 10, the casing 90 being constantly urged outwardly so as to keep the roller 99 constantly in contact with the cam 100 by spring 101 arranged between the fixed abutment 102 and the supporting standard 103 and the lug 104 depending from the outer end of the casing 90. The roller 88 is constantly rotated at a suitable speed by a sprocket wheel 105 which is connected by a chain 106 with a sprocket wheel 107 on the shaft 94. The sprocket chain is kept taut by a roller 108 carried on the arm 109 pivoted on the standard 103 and constantly urged outward against the chain by a spring 110. It follows from this construction that during each cycle of operations and while the book is positioned above the adhesive-applying mechanism, the roller 88 will be lifted by the cams 93 then moved inwardly by the cam 100, and at the same time rotated in the opposite direction to its movement so as to have rolling contact with the back of the book, then lowered by the cams 93 and returned to its first position by the spring 101 under the control of the cam 100. This will cause the glue or other adhesive to be firmly pressed to the back of the book and plentifully supplied at the edges thereof without being applied to the ends.

Next in order along the path of the book-conveying means, in the illustrated embodiment, is situated the mechanism for attaching the cover to the book back to which the adhesive has already been applied. The illustrated form of such means (see especially Figs. 1 to 4, 11, 14, and 15) comprises a cover stack relatively movable with respect to a book held by the conveying means for bringing the book back and the cover into contact. The stack of covers 112 is supported on a table 113 which moves to lift the top cover of the stack into contact with the back of the book. The table is movable upon guides 114 which it engages by means of rollers 115.

Means are provided for feeding up the table in order to keep the surface of the stack at a substantially uniform level comprising a screw-threaded rod 116 supporting the table 113 (see Figs. 2, 4, 11, 14, and 15). This rod 116 is threaded into the column 117 and the bevel gear 118 is keyed to said column so that the column and gear rotate together but the column is free to slide relatively to its gear. The column 117 has fixed thereto the grooved collar 119, which is engaged by the lugs 120 carried by the yoked arm 121 fixed to the shaft 122. Fixed to the shaft 122 is an arm 123 carrying in its yoked end a roller 124 bearing on a cam 125 upon the shaft 27. Meshing with the gear 118 is a gear 127 fixed on a common shaft with the ratchet wheel 128. A gang of pawls 130 are shown carried by a reciprocating arm 131 sleeved upon the shaft 129. A pivoted link 132 connects said arm to an arm 133 fixed to the shaft 122. The link 132 is connected with the arm 133 by means of a slidable block 134 carried on a screw-threaded rod 135 whereby the throw of the arm 131 may be nicely and accurately adjusted within a very wide range. This, together with the hang of pawls 130, gives an accurate and nice adjustment for the widest range of thicknesses in cover blanks, while providing a construction of the requisite strength. It will be understood that the rotative movement of the column 117 with the gear 118 serves to regulate the height of the table, while the sliding movement of the column relatively to its gear by reason of their spline connection permits the table to be raised and lowered.

Suitable guides for the sides of the cover stack are provided, movable or adjustable to accommodate covers of different sizes, and means are preferably provided whereby the guides on different sides of the table are adjustable together or separately. The illustrated form of said means (see Figs. 2, 11, 14, and 15) comprises a screw-threaded shaft 136, supported by the table structure, and having splined thereon a pinion 137 fixed to a hand wheel 138. The pinion and its hand wheel are slidable upon the shaft 136 to move the pinion into and out of mesh with a pinion 139 upon the shaft 140. A lug 141 is in threaded engagement with the shaft 136 and is slidably supported upon the shaft 140. The lug 141 carries the guide 142. The shaft 140 at the opposite end of the table is in threaded engagement with a lug 143 which has sliding engagement with the unthreaded end of the shaft 136. The lug 143 in turn carries the guide 144. It will be understood that if the hand wheel 138 be rotated with the pinions 137 and 139 in mesh that both the guides 142 and 144 will be moved relatively to the table. But if the hand wheel 138 and pinion 137 are slid to bring the latter out of mesh with the pinion 139, only the guides 142 will be moved. By combining these two operations of the mechanism it will be seen that a very rapid and also symmetrical adjustment with respect to the table of both guides is obtained.

Guides for the sheet stack, located on the side of the stack toward which the cover feeds off after it has become adherent to the book back, are provided. Two of these guides 145 located at opposite sides of the center of the stack are arranged to swing out of the path of the cover as it moves away. The central guide 145ª is fixed in a bracket 145ᵇ which is adjustable to and from the standard 114, which forms a fixed guide for the opposite side of the stack, said bracket being mounted on a pair of supporting rods 145ᶜ fixed in the supporting frame of the table 113. The guide 145ª does not need to move out of the path of the covers, as the central portion of the cover is always lifted above the top of this guide by being stuck to the back of the book. The guides 145 are moved out of the path of the unattached portions of the cover by a suitable mechanism (see especially Figs. 14 and 15). As shown, these guides 145 are fixed on a rock shaft 146 which is journaled in the bracket 145ᵇ. Fixed also to the said shaft 146 is an arm comprising the parts 147, 148 and 149, which are adjustably connected to each other, the part 149 carrying a roller 151 adapted to engage a cam 150 conveniently fixed on the oscillating arm 133. By suitably adjusting the parts 147, 148, and 149 the guides 145, irrespective of their position with respect to the opposing guide 114, will be swung out of the path of the unattached portions of the cover, as the latter is moved away from the cover-applying station by the book conveyer.

After leaving the cover-attaching mechanisms, the books are subjected to the action of mechanism for pressing the cover firmly to the back and for pinching and breaking it around the edges of the back so that at the proper time the covers will fall into place along the sides of the book. In the illustrated embodiment (see especially Figs. 2, 5, 12, and 13) said mechanism comprises a bed or supporting surface 152 and a pair of moving jaws 153—154. The table or bed 152 moves up into contact with the cover to press it firmly against the back of the book, and while it is so pressed, the jaws 153 and 154 move against the edges, as shown by the arrows in Fig. 13, to pinch and break the edges of the cover $x$ about the book $y$. For this purpose the bed 152 is carried upon vertically movable supports 155. Fixed to said supports are lugs 156, the supports 155 being slidably guided and mounted in the brackets 157 on the machine frame. In operative relation with the lugs 156 are shown arms 158, sleeved upon the shaft 122 and in operative relation with a cam 159 upon the shaft 27.

Means are provided for adjusting the jaws 153 and 154 for books of different thicknesses, and according to one feature of the invention adjusting means for each jaw are provided. The jaws 153 and 154 are slidably mounted upon the frame which supports the bed 152. Each of the jaws is provided with a downwardly extending lug 160, yoked upon a collar 161 carried by a rod 162 threaded into a block 163, and provided with a handle 164. The block 163 is pivotally connected to one arm of a bell-crank lever 165.

A common actuating means for the two pinching and breaking jaws is provided, and in the illustrated form a link 166 is pivoted to the other end of each of the bellcrank levers 165. Said link is pivoted also to a lever 167 pivoted on the brackets 157 engaged by a cam 168 upon the shaft 27. The spring 170 serves to move the jaws 153 and 154 in the opposite direction. It will thus be understood that a simple operating mechanism has been provided for the pinching and breaking jaws and at the same time an independent and likewise a nice adjustment for each jaw.

In the present embodiment a cover-setting station is provided, and as the series of book conveyers progresses along the circular path and comes to rest in operative relation with each of the mechanisms successively, each book after having the cover pressed to the back and broken around the edges of the back progresses to the cover-setting station. A supporting shelf 171 (see Fig. 2) serves to carry the cover and it is shaped at the delivery mechanism to assist in laying the cover against the side of the book, as it is delivered.

The delivering mechanism is illustrated in Figs. 1, 3 and 17, and comprises a fly-operated receiving plate or receiver 181, fly-arms 172, 172 fixed to a shaft 173, and connections including a short arm extending downwardly from shaft 173, to which arm a link 174 is pivoted, the link extending to one arm of a lever 175, the other arm of which has pivoted to it a rod 176 connecting with an arm 177 sleeved on the shaft 122 (see Figs. 2 and 3). Said arm is through the roller 178 in operative relation with a cam 179 on the shaft 27. The spring 180 is arranged between the rod 176 and the machine frame to draw the lever 176 against its cam and to operate in moving the fly in one direction. Pivotally carried by the arms 172 is a receiver 181, and a plate 182 is arranged to direct the book into the receiver, as the jaw 14 of the book conveyer is drawn away by the cam 18 to release the book. Connected to the receiver 181 is shown a spring 183, which acts in connection with the pivotal mounting to lay the book against the face of the delivered stack of bound books as the fly mechanism moves over to the hopper carrying said stack.

The receiving hopper for the covered books is located in proper position with respect to the fly mechanism 172, and it is also made relatively movable so as to accommodate a varying number of books, and at the same time keeps the top of the stack in position to receive the succeeding bound book when delivered thereto. Said hopper comprises an inclined support 184 for the book-stack traveling on inclined ways 185 by suitable means, such as the rollers 186. To maintain the top of the delivery stack at approximately a constant position with respect to the fly mechanism notwithstanding variations in the number of books carried by the supporting table 184, the hopper is yieldingly supported by a spring 187, the tension of which varies directly with the number of books delivered onto the hopper. When a group of books is removed from the table 184, the spring will draw the table upwardly so as to approximately restore the receiving surface to position.

Means are provided for throwing out or stopping the machine in case a book is not delivered from the book conveyer at the delivery station. The form of such means shown will be described in connection with the driving mechanism of the machine. As shown herein (see Figs. 1–4) a belt pulley 188 is carried on the shaft 10 and connected thereto by a suitable clutch mechanism. The clutch mechanism comprises a sliding member 190 engaged by the yoked lever 191 which actuates the sliding clutch member 190 to connect and disconnect the driving pulley 188 from the shaft. In pivotal connection with the lever 191 is a sliding rack bar 192, which meshes with a toothed sector 194 upon a shaft 195. The oscillation of the shaft therefore serves to throw in and out the clutch. This same movement is utilized to apply a brake to the fly wheel 189 and thus promptly stop the machine. To this end a brake 193 is arranged adjacent to the fly wheel 189 and is connected by a lever 193$^a$ and link 193$^b$ to the rack bar 192, so that when the said bar is moved to disconnect the clutch the brake will be simultaneously applied to the fly-wheel.

The tripping mechanism (see Figs. 3, 12 and 17) operated by an undelivered book is conveniently connected to actuate the shaft 195 and so stop the machine. Contiguous to the delivery station and positioned so as to be engaged and moved by a book remaining in the book-conveyer after it has passed, or just as it starts from, the delivery station, is a plate or trip 196. This is pivotally mounted and connected thereto is a lever 197, having a lug 198 adapted to engage a similar lug on the pivoted lever 199. Fixed to the shaft 195 is an arm 200 and pivoted to said arm is a rod 201. A spring 202 is arranged to press the mechanism in the direction for throwing out the machine but means for preventing this movement are provided comprising a stop bar 203 which may conveniently engage the standard 204, or any other suitable part of the machine. The bar 203 is movable transversely out of alinement with the stop 204, and when so out of alinement, the spring 202 is free to actuate the mechanism and throw out the clutch 190. To give this transverse movement to the bar 203, the tail of the lever 199 is arranged thereagainst so that a book striking the trip 196 will release the lever 199 which under the impulsion of a spring 205 moves the bar 203 out of engagement with its stop.

Suitable means for throwing out the machine by hand are provided, and for this purpose there are hand levers 206 at various parts of the machine having suitable connections to the shaft 195. Connections between the book trip 196 and the rod 201 are provided to permit the operation of the throw-out mechanism manually without disturbing the book-trip. For this purpose, the stop 203 is shown having a pin and slot engagement with the rod 201 at 207, as shown in Fig. 18.

The manner of operation of the herein-described mechanism will be understood from the foregoing description but a brief statement thereof will be appended, having in view especially the coöperation of the various parts with each other to produce the desired result. A series of books are loaded into the holder for the uncovered books, the various parts of the advancing means having been previously moved into position to act upon the various books of the series along their edges. An amount of advancing movement corresponding to the thickness of books is given by this mechanism by radial adjustment of the connection between the link 32 and its crank arm 31. The books will thus be kept advanced in proper position against the stop at the delivery end of the holder, and the transferring device will engage the end book of the series, by means of the fingers 62 lifting each book over the stop, the next book being held by the stop. As the transferring device moves outwardly the book will be pushed out of engagement with its supports and will drop into the book conveyer beneath, the jaw 14 being at this time held back by the cam 18. The table 81 will position the book back at the proper level with respect to the various mechanisms which are to operate upon it. As the book conveyer starts along its path of travel, the gage 87 will position the book longitudinally with reference to the conveyer, and the jaw 14 is then released and engages and firmly holds the book in position. The conveyer then passes successively to the adhesive-applying mechanism, the cover-applying mechanism, the pinching and breaking mechanism, the cover-setting station, and then to the delivery station. The manner of operating upon the book at each of these stations will be clearly understood from the description heretofore given in connection with the construction of the particular mechanism. Should the book fail to be delivered at the delivery station, the throw-out mechanism will operate in the manner specified hereinbefore.

It will be understood that the invention in its broader aspects is not limited to the particular mechanisms illustrated nor to any particular constructions by which the invention has been or may be carried into effect, as many changes may be made in the details of construction and the arrangement of the parts without departing from the main principles of the invention and without sacrificing its chief advantages.

I claim:

1. A book covering machine including in combination, a series of book-conveying means traveling in a horizontal circular path, a plurality of mechanisms located at stations along said path for performing, respectively, on the books carried by said series of book-conveying means various operations involved in covering, a holder for a series of uncovered books arranged above the space inclosed by said circular path, means for transferring a book from said holder to each of said book-conveying means successively, and means for progressing the book-conveying means from one mechanism to the next.

2. A book covering machine including in combination, cover-applying mechanisms, a conveyer moving in a circular horizontal path, a holder for a series of uncovered books horizontally arranged above the space inclosed by said path, and means for transferring a book from said holder to said conveyer.

3. A book covering machine including in combination, cover-applying mechanisms, a conveyer moving in a circular horizontal path, a horizontally arranged holder for a series of uncovered books located above the space inclosed by said path, advancing means acting on the books within said holder, and means for transferring a book from said holder to said conveyer.

4. A book covering machine including in combination, cover-applying mechanisms, means having a horizontal circular path for conveying the books to said mechanisms, a holder for a series of uncovered books arranged horizontally above said path, means for positively advancing the books in said holder, and means for separating the books and delivering them one at a time to said conveyer.

5. A book covering machine including in combination, cover-applying mechanisms, means having a horizontal circular path for conveying the books to said mechanisms, a holder for a series of uncovered books arranged horizontally above said path, means for positively advancing the books in said holder, means for varying the size of said holder and said advancing means to accommodate books of different dimensions, and means for separating the books and delivering them one at a time to said conveyer.

6. A book covering machine including in combination, cover-applying mechanisms, a conveyer traveling in a horizontal circular path for conveying the books to said mechanisms, a holder for a series of uncovered books horizontally arranged above said conveyer, means for transferring a book from the holder to the conveyer successively, and means for positively advancing the books in the holder to the transferring means.

7. A book-covering machine including in combination, cover-applying mechanisms, means traveling in a horizontal circular path for conveying the books to said mechanisms, a holder for a series of uncovered books horizontally arranged above said conveying means, means for transferring a book from said holder to said conveying means, means for advancing the series of books in the holder to said transferring means, and means for regulating the relative speed of operation of said transferring means and said advancing means.

8. A book covering machine including in combination, a book-conveying means having capacity for a series of books, means for moving said conveyer intermittently, an adhesive-applying roller, means for moving said roller transversely of the book back in contact therewith while the conveyer is stationary, a rotating mechanism, not including the book as a part thereof, adapted to effect the rotation of said adhesive applying roller during and in a reverse direction to the transverse movement of said roller, and means for returning the roller to its normal position while the conveyer is in motion.

9. A book-covering machine including in combination, book-conveying means, means for applying adhesive to a book held by said means, a support for a stack of covers, means for bringing the top cover of the stack and the back of the book into contact by a movement transverse to the path of said conveying means, guides for the edges of the stack, and means for moving a guide out of the path of the top cover as the latter moves away with the book.

10. A book covering machine including in combination, book-conveying means moving in a horizontal path, means for applying adhesive to a book held by said means, a support for a stack of covers, means for bringing the top cover of the stack and the back of the book into contact by a movement transverse to the path of said conveying means, guides for the edges of the stack, and means for swinging a guide out of the path of the top cover as the latter moves away with the book.

11. A book-covering machine including in combination book-conveying means, cover-applying means, book-discharging means, a support for receiving the discharged covered books, and a yielding means resisting the depression of such support and operated by the weight of the books for positioning the support according to the number of books thereon, said yielding means being calculated to maintain the upper face of the book stack on said support in substantially a constant position.

12. A book covering machine, including in combination book conveying means, cover applying means, book discharging means, a book support mounted to move upon a downward incline as the number of books thereon increases, and an elastic means for sustaining said support against descent, said elastic means being calculated to maintain the upper face of the book stack on said support in substantially a constant position.

13. A book covering machine including in combination book conveying means, cover applying means, book discharging means, including a fly for receiving a book from the conveying means and delivering it to the hereinafter mentioned support, a book support mounted to move downward as the number of books thereon increases, and an elastic means for sustaining said support against descent, said elastic means being calculated to maintain the upper face of the book stack on said support in substantially a constant position.

14. A book covering machine including in combination book conveying means, cover applying means, book discharging means, including a fly for receiving a book from the conveying means and delivering it to the hereinafter mentioned support, a book support mounted to move upon a downward incline as the number of books thereon increases, and an elastic means for sustaining said support against descent, said elastic means being calculated to maintain the upper face of the book stack on said support in substantially a constant position.

In testimony whereof, I have signed my name to this specification, in the presence of two subscribing witnesses.

ALFRED BREDENBERG.

Witnesses:
GUS. AVERILL, Jr.,
JAS. DE T. BURROUGHS.